(12) United States Patent
Danziger et al.

(10) Patent No.: US 6,442,320 B1
(45) Date of Patent: Aug. 27, 2002

(54) LIMITED MODE DISPERSION COMPENSATING OPTICAL FIBER

(75) Inventors: Yochay Danziger, Rishon le Zion; Michael Rosenblit, Ashdod, both of (IL)

(73) Assignee: LaserComm Inc., Plano, TX (US)

( * ) Notice: Subject to any disclaimer, the term of this patent is extended or adjusted under 35 U.S.C. 154(b) by 0 days.

(21) Appl. No.: 09/549,442

(22) Filed: Apr. 14, 2000

Related U.S. Application Data

(60) Provisional application No. 60/129,641, filed on Apr. 16, 1999.

(51) Int. Cl.[7] .................................................. G02B 6/02
(52) U.S. Cl. ...................................................... 385/123
(58) Field of Search ................................ 385/123–132, 385/141–145, 24; 372/6; 359/161, 173, 179, 189, 195

(56) References Cited

U.S. PATENT DOCUMENTS

| | | | |
|---|---|---|---|
| 5,361,319 A | | 11/1994 | Antos et al. ................. 385/123 |
| 5,448,674 A | * | 9/1995 | Vengsarkar et al. ......... 385/123 |
| 5,802,234 A | | 9/1998 | Vengsarkar et al. ......... 385/123 |
| 6,044,191 A | * | 3/2000 | Berkey et al. .............. 385/123 |
| 6,317,551 B1 | * | 11/2001 | Mitchell et al. ............ 385/124 |
| 6,324,327 B1 | * | 11/2001 | Herring et al. ............. 385/123 |
| 6,339,665 B1 | * | 1/2002 | Danziger ................... 359/161 |

* cited by examiner

Primary Examiner—Akm E. Ullah
Assistant Examiner—Michelle R. Connelly-Cushwa
(74) Attorney, Agent, or Firm—Simon Mark Kahn

(57) ABSTRACT

The present invention relates in one aspect, to a refractive index profile designed to support higher order spatial modes, and in particular the $LP_{02}$ spatial mode in an optical waveguide. The waveguide exhibits negative dispersion and negative dispersion slope and negative third order dispersion over the operating wavelength. In one embodiment, the profile is designed with a reduced refractive index depression in the center core region, and is intended to enhance the properties of the dispersion compensating waveguide. In addition, the refractive index profile of the present invention supports the $LP_{02}$ mode. A limited mode dispersion compensating optical waveguide according to the present invention includes a center core portion having a center core refractive index. The waveguide also includes an outer core portion surrounding the center core portion and having an outer core refractive index that is greater than the center core refractive index. The waveguide further includes a first cladding portion surrounding the outer core portion and having a first cladding refractive index that is less than the outer core refractive index. In another embodiment, the ratio of the difference between the outer core refractive index and the center core refractive index to the outer core refractive index is greater than about 0.2%. The dispersion compensating optical waveguide supports at least one high order spatial mode.

29 Claims, 15 Drawing Sheets

LIMITED MODE DISPERSION COMPENSATING OPTICAL FIBER

PRIORITY CLAIM TO RELATED APPLICATIONS

This application claims priority to provisional U.S. patent application No. 60/129,641 which was filed in the United States Patent Office on Apr. 16, 1999.

FIELD OF THE INVENTION

The invention relates generally to limited mode optical fibers used in optical fiber communication systems and in particular to high order mode dispersion compensating optical fibers.

BACKGROUND OF THE INVENTION

One measure of the performance of optical communication systems is the maximum bandwidth; the highest bit rate supported in the communication system. The bit rate generally refers to the speed in which data is transferred from one place to another. High bit rates permit large quantities of data to be transferred in a short period of time. The bit rate is often limited by physical characteristics of the communication link. For example, optical links typically transfer data through an optical waveguide such as an optical fiber in the form of light pulses. As the pulse of light propagates through the fiber, different wavelengths travel at different velocities. This speed differential of the various wavelengths making up the pulse, referred to as chromatic dispersion, causes a short pulse input to one end of the fiber to emerge from the far end as a broader pulse. This limits the bit rate at which information can be carried through an optical fiber. The effect of chromatic dispersion on the optical signal becomes more critical as the bit rate increases. Chromatic dispersion in an optical fiber is the sum of material dispersion and the waveguide dispersion and is defined as the derivative of the group delay with respect to wavelength divided by the length of the fiber.

Dispersion slope is defined as the rate of change of the total chromatic dispersion of the fiber as the wavelength changes, that is, the derivative of the dispersion with respect to wavelength. It is also know as second order dispersion. Third order dispersion is defined as the rate of change of the dispersion slope with respect to wavelength.

In order to achieve the high performance required by today's communication systems with their demand for higher bit rates, it is necessary to reduce the effect of chromatic dispersion. Several possible solutions are known to the art, including both active and passive methods of compensating for chromatic dispersion. One typical passive method involves the use of dispersion compensating (DC) fibers. DC fiber has dispersion properties that compensate for the chromatic dispersion inherent in optical communication systems. DC fibers exist that are designed to operate on both the fundamental or lowest order mode ($LP_{01}$), and on higher order modes.

One desired property of DC fiber is significant negative dispersion. Increasing the magnitude of negative dispersion reduces the length of fiber required to compensate for a large amount of positive dispersion. Another desired property of a DC fiber is low optical signal attenuation. Preferably a DC fiber compensates for chromatic dispersion and dispersion slope, and would be operative over the entire transmission bandwidth. The optical transmission bandwidth typically utilized is known as the "C" band, and is conventionally thought of as from 1525 nm–1565 nm. Longer wavelengths are also coming into usage, and are known as the "L" band, consisting of the wavelengths from 1565 nm–1610 nm.

Refractive index profiles that support desired higher order modes typically also support undesired higher order modes which can generate unwanted effects. Furthermore, periodic perturbations in the fiber such as periodic bending due to spooling create coupling between the desired high order mode and the undesired high order modes guided in the fiber. Modes having approximately the same propagation constants couple more than modes having significantly different propagation constants. The propagation constant β is a function of the refractive index n according to the formula $\beta=2\pi n/\lambda$. Thus, in place of the propagation constant β, the effective refractive index or each mode $n_{eff}$ may be utilized for each wavelength to determine the strength of coupling between modes.

Typical dispersion compensating fibers are designed as single mode fibers which support only the fundamental or $LP_{01}$ mode at operating wavelengths. Such fibers are characterized by having relatively low negative dispersion, high optical loss, and small effective area $A_{eff}$. These fibers typically have low tolerance for high power, exhibit poor macro-bending loss, and provide limited compensation of dispersion slope. Higher order spatial modes such as the $LP_{02}$ mode are typically not guided through the fiber.

U.S. Pat. No. 5,361,319 discloses a family of DC fibers that are capable of providing dispersion which is more negative than –20 ps/nm·km and attenuation of less than 1 dB/km at wavelengths in the 1520 nm to 1565 nm range. Several of the disclosed DC fibers also exhibit a negative dispersion slope in this region. The refractive index profiles are typically designed to have a relatively large difference in refractive index between the central core region and the surrounding cladding when compared to a conventional step index single mode fiber. The fibers also typically exhibit a relatively narrow width for the central core region as compared with conventional step index single mode fibers. The maximum dispersion achievable by these fibers is approximately –100 ps/nm·km with a dispersion slope of approximately 0.8 to 1.2 ps/nm²·km. The profile is designed to operate in the $LP_{01}$ mode, and not to support other higher order modes.

U.S. Pat. No. 5,448,674 discloses an optical DC fiber, containing a power law core refractive index profile, a refractive index "depression" (i.e., trench) surrounding the core, and a refractive index "rise" (i.e., ridge) surrounding the trench. The refractive index profile is designed to support the $LP_{01}$ and $LP_{02}$ modes, but not the $LP_{11}$ mode at $\lambda_{op}$, the operating wavelength. Dispersion compensation is accomplished with the optical signal in the $LP_{01}$ mode. Any optical power which is transferred to the $LP_{02}$ mode is lost, thereby contributing to a greater system loss.

U.S. Pat. No. 5,802,234 discloses an optical DC fiber with a refractive index profile selected such that the fiber supports the $LP_{01}$ mode, the $LP_{02}$ mode, and typically at least one higher order mode. The dispersion is substantially all in the $LP_{02}$ mode. The total dispersion is more negative than –200 ps/nm·km over a wide wavelength range. The refractive index profile exhibits an effective mode field diameter which increases with increasing wavelength as the mode energy expands to the refractive index "ring" area. Such a mode field diameter results in losses in the operating wavelength range of 1525 nm to 1560 nm as the $LP_{02}$ mode expands into the refractive index "ring" with increasing wavelength. The DC fiber is designed to be operated in the trough of the dispersion curve, (i.e. close to the cutoff wavelength for the mode). The profile is designed so that the dispersion curve in the operative wavelengths is relatively flat, and thus relatively insensitive to manufacturing variations. The third order dispersion in this region is positive, with the slope increasing, indicative of attenuation losses in the $LP_{02}$ mode.

A need exists for a dispersion compensating fiber which overcomes these and other drawbacks of the prior art.

SUMMARY OF THE INVENTION

The present invention relates in one aspect, to a refractive index profile designed to support higher order spatial modes, and in particular the $LP_{02}$ spatial mode in an optical waveguide. The waveguide exhibits negative dispersion and negative dispersion slope and negative third order dispersion over the operating wavelength. In one embodiment, the profile is designed with a reduced refractive index depression in the center core region, and is intended to enhance the properties of the dispersion compensating waveguide. In addition, the refractive index profile of the present invention supports the $LP_{02}$ mode.

A limited mode dispersion compensating optical waveguide according to the present invention includes a center core portion having a center core refractive index. The waveguide also includes an outer core portion surrounding the center core portion and having an outer core refractive index that is greater than the center core refractive index. The waveguide further includes a first cladding portion surrounding the outer core portion and having a first cladding refractive index that is less than the outer core refractive index. The dispersion compensating optical waveguide supports at least one high order spatial mode. In one embodiment, the spatial mode is the $LP_{02}$ spatial mode.

Another embodiment of the limited mode dispersion compensating optical waveguide of the present invention includes a center core portion having a center core refractive index $n_{CC}$. In another embodiment, the ratio of the difference between an outer core refractive index $n_{OC}$ and the center core refractive index $n_{CC}$ to the outer core refractive index $n_{OC}$ is greater than about 0.2%, and an outer core portion surrounds the center core portion and the outer core refractive index $n_{OC}$ is greater than the center core refractive index $n_{CC}$. The optical waveguide further includes a first cladding portion surrounding the outer core portion and having a first cladding refractive index $n_{CL1}$. The first cladding refractive index $n_{CL1}$ is less than the outer core refractive index $n_{OC}$.

Still another embodiment includes a second cladding portion surrounding the first cladding portion and having a second cladding refractive index $n_{CL2}$ which is greater than the first cladding refractive index $n_{CL1}$. Yet another embodiment includes a third cladding portion surrounding the second cladding portion and having a third cladding refractive index $n_{CL3}$ which is less than the second cladding refractive index $n_{CL2}$. In still another embodiment, the optical waveguide supports at least one high order spatial mode and exhibits negative dispersion and negative dispersion slope over an operative wavelength range. In yet another embodiment, the operative wavelength range is about 1525 nm to about 1565 nm. In yet another embodiment, the operative wavelength range is about 1565 nm to about 1610 nm.

The invention is alternatively embodied in an optical communication system including an optical transmitter for generating an optical signal and an optical transmission fiber optically coupled to the optical transmitter. The system further includes a limited mode dispersion compensating optical waveguide supporting at least one higher order spatial mode, and exhibiting negative dispersion, negative dispersion slope and negative or zero third order dispersion substantially over an operative wavelength range. The limited mode dispersion compensating optical waveguide is optically coupled to the optical transmission fiber. The system also includes a receiver optically coupled to the limited mode dispersion compensating optical waveguide. The receiver generates an output signal in response to the optical signal.

DETAILED DESCRIPTION OF THE INVENTION

Figure 1:
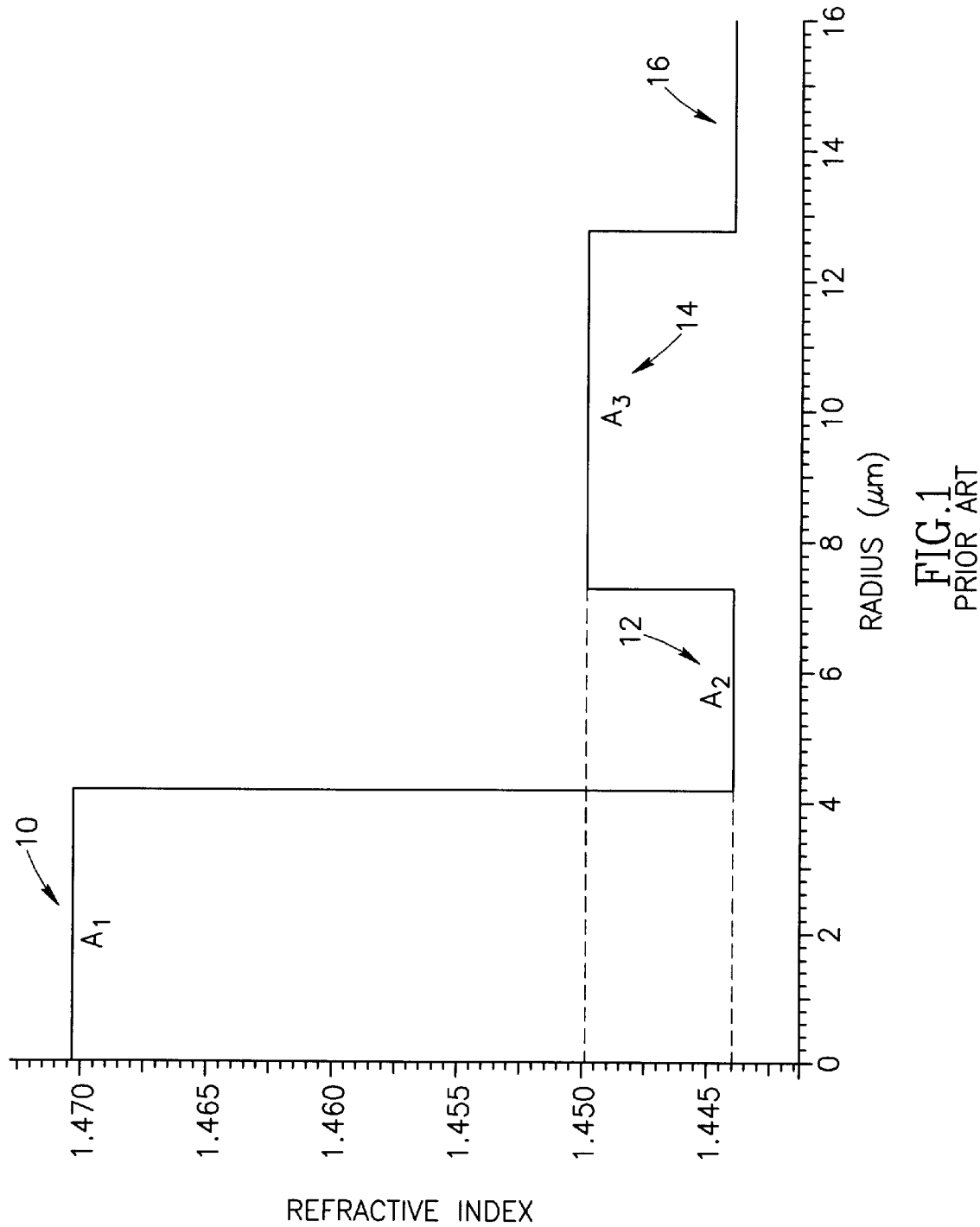
FIG. 1 illustrates a radial view of a refractive index step profile for a typical dispersion compensating fiber known to the prior art.

FIG. 1 illustrates a radial view of a refractive index step profile of a dispersion compensating fiber designed to operate in the $LP_{02}$ mode, known to the prior art. The profile includes a core region 10, a first cladding region (trench) 12, a second cladding region (ridge) 14, and a third cladding region 16. The profile of FIG. 1 corresponds to a fiber having a core diameter of 4.2 μm, an outer trench radius of 7.3 μm and an outer ridge radius of 12.7 μm, and a third cladding region 16 that extends to the fiber surface. The parameter delta (Δ) is defined as $\Delta(r)=(n(r)-n_0)/n_0$, where $n_0$ is the refractive index of pure vitreous $SiO_2$ and $n(r)$ is the refractive index at radius r. The profile exhibits a $\Delta(r)$ of 1.83% in the core region 10 (known as the $A_1$ region), a $\Delta(r)$ of 0.0% in the $A_2$ region, followed by a $\Delta(r)$ of 0.39% of the wide lower step in the $A_3$ region. The third cladding region 16 having a $\Delta(r)$ of 0.0% extends to the outer surface of the fiber.

Figure 2:
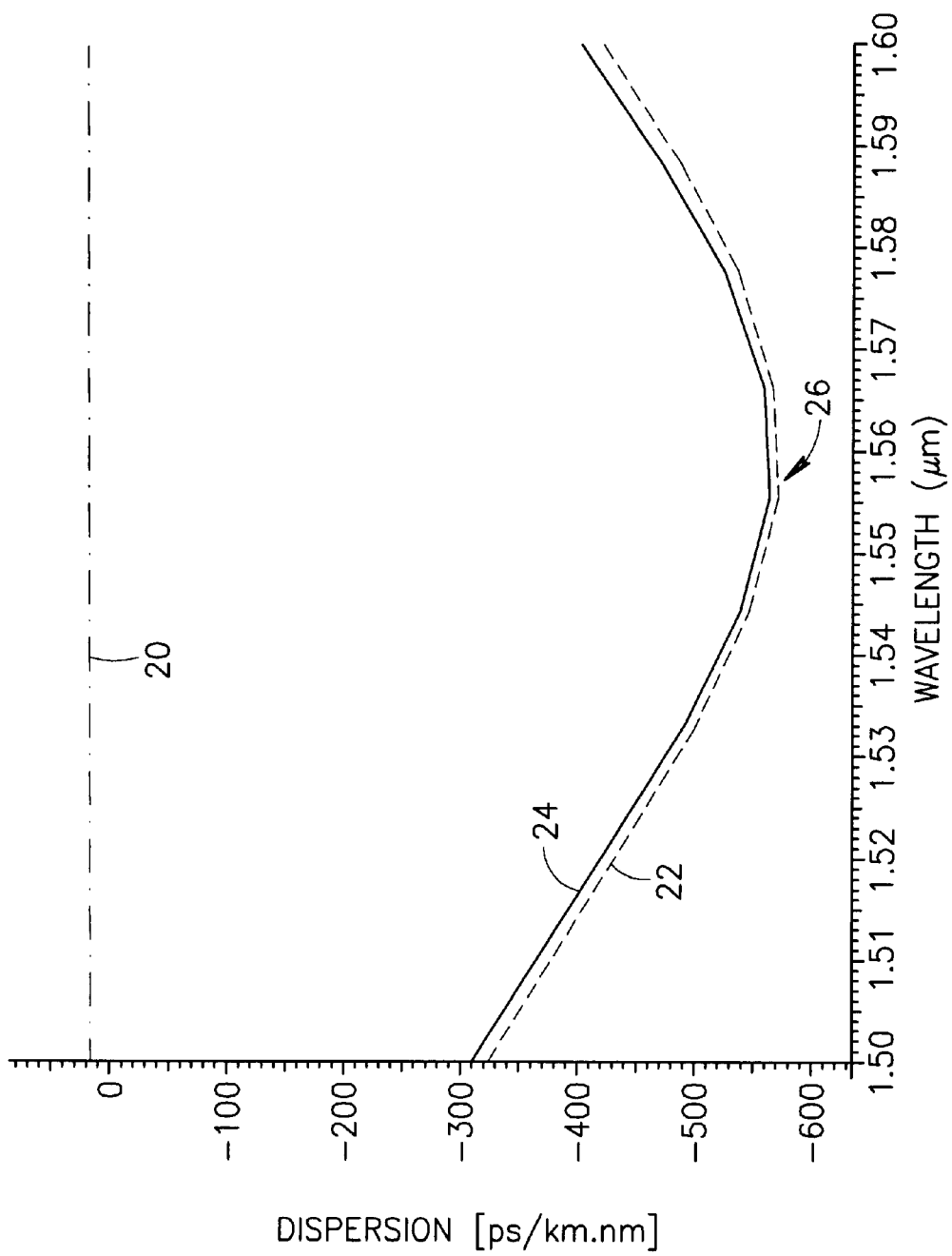
FIG. 2 illustrates material, waveguide, and total dispersion versus wavelength typically achieved by a fiber having the step index profile of FIG. 1.

FIG. 2 illustrates dispersion curves in the $LP_{02}$ mode for the prior art step index profile shown in FIG. 1. The total dispersion is defined as the sum of the material dispersion and the waveguide dispersion. Curve 20 represents the material dispersion. Curve 22 represents the waveguide dispersion. The total dispersion is shown as curve 24. The total dispersion curve 24 shows a trough 26 near the operating wavelength of 1550 mn, which is approximately the maximum negative dispersion point. The dispersion in this wavelength range is more negative than −500 ps/km·nm. The negative slope in this operating range is minimal. The third order dispersion in the operating range is positive, with the slope itself becoming positive at approximately 1555 nm, which is indicative of high attenuation losses in the $LP_{02}$ mode in this region.

Figure 3:
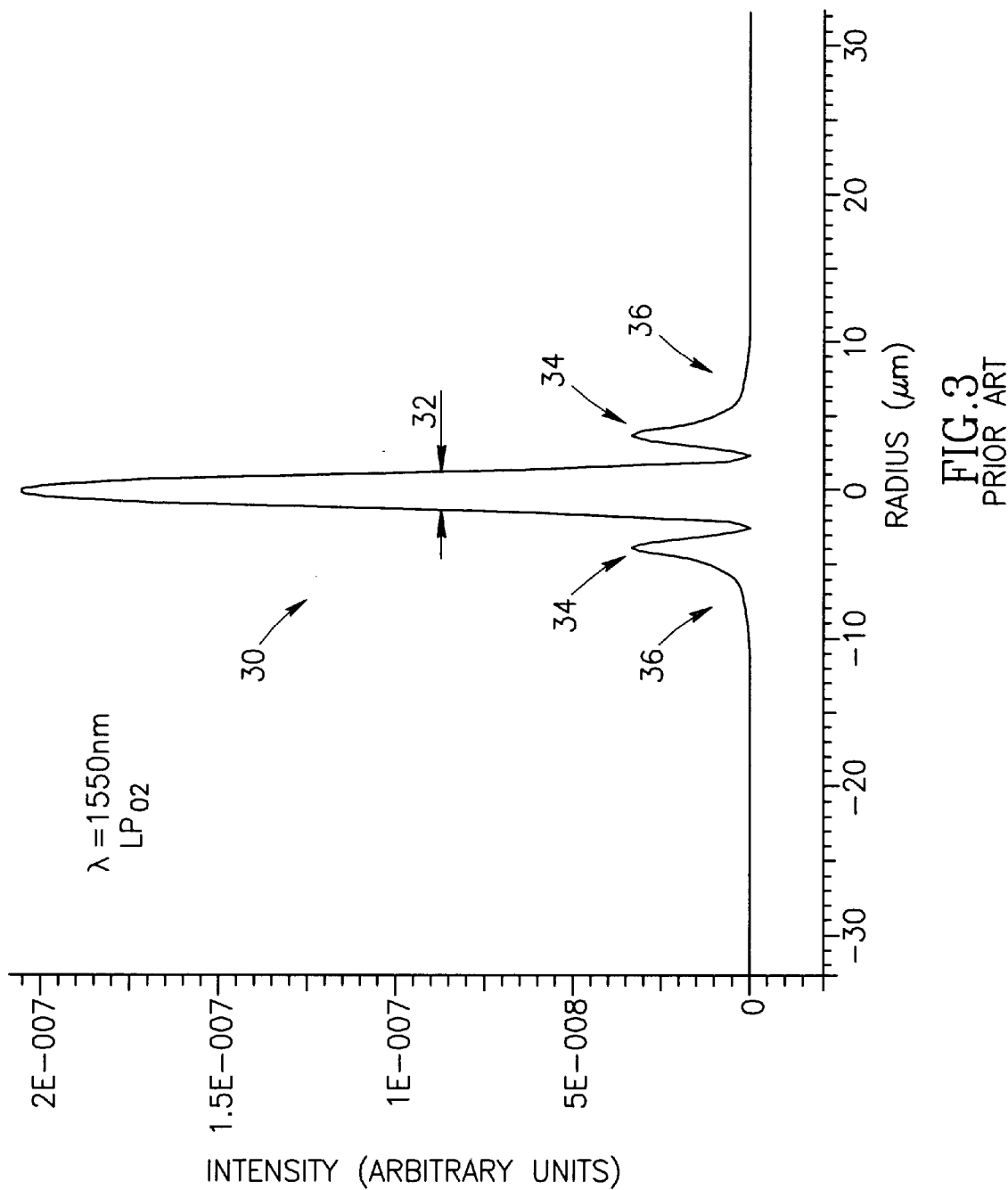
FIG. 3 illustrates intensity versus radial location of the $LP_{02}$ mode at 1550 nm as guided by a fiber having the step index profile of FIG. 1.

FIG. 3 illustrates a plot 30 of the modal energy for the $LP_{02}$ mode at the 1550 nm wavelength for the prior art step index profile shown in FIG. 1. The X-axis represents radial distance in microns, and the Y-axis represents energy in arbitrary units. Region 32 of plot 30 shows the maximum intensity, which is contained in the ($A_1$) region 10. Region 34 of plot 30 shows the remaining energy which is primarily in the ($A_2$) region 12. The mode is of normal appearance, with almost no energy found in the ($A_3$) region 14 of FIG. 1.

Figure 4:
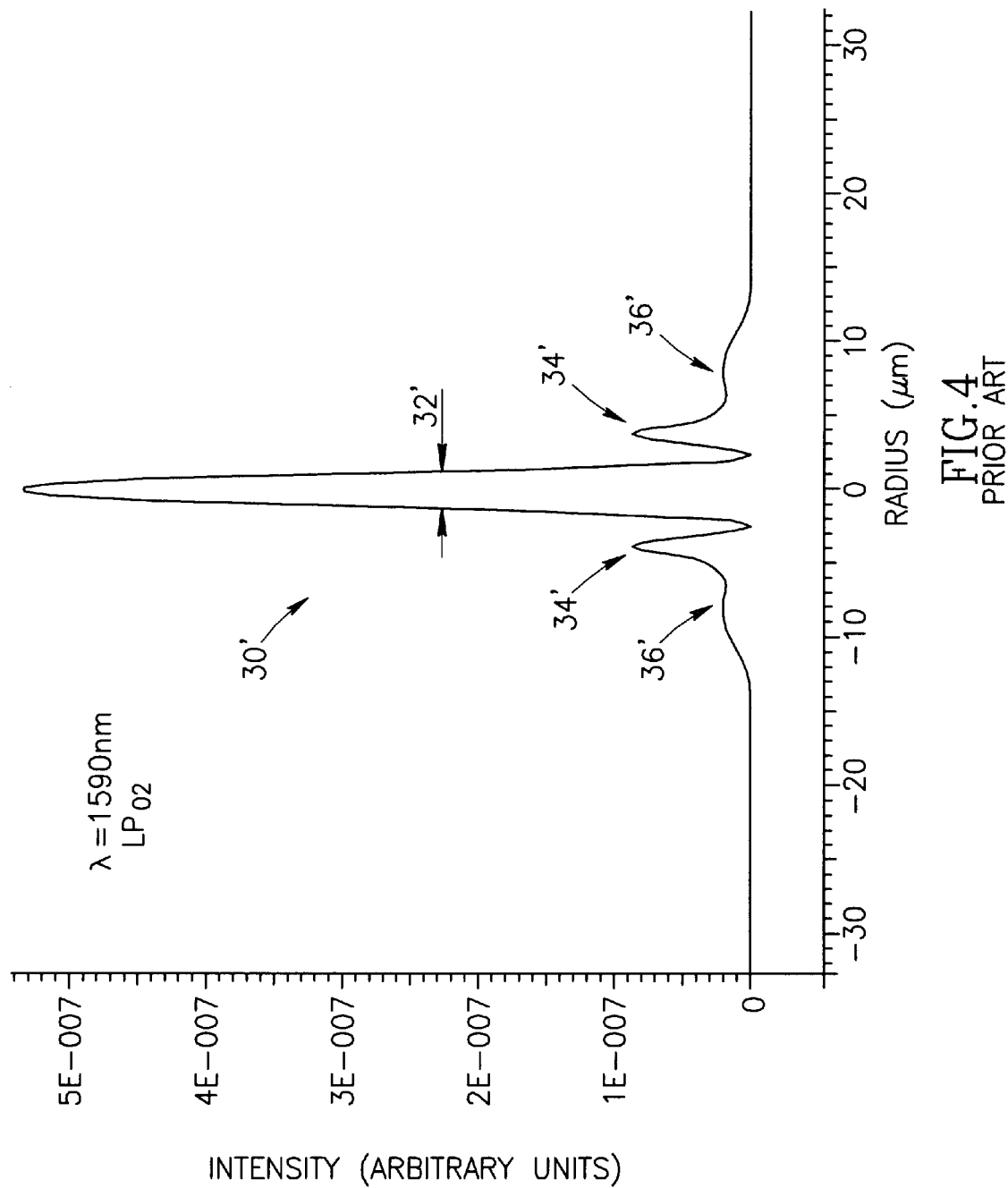
FIG. 4 illustrates intensity versus radial location of the $LP_{02}$ mode at 1590 nm as guided by a fiber having the step index profile of FIG. 1.

FIG. 4 illustrates a plot 30' of the modal energy for the $LP_{02}$ mode at the 1590 nm wavelength for the prior art step index profile shown in FIG. 1. The axes are the same as shown in FIG. 3. Here, the mode shows an abnormal additional rise 36' near the 8.0 μm radial location, and that abnormality extends to the outer radius of the ($A_3$) region 14. This is indicative that the operative wavelength is close to the cutoff wavelength, and attenuation of the $LP_{02}$ mode is increasing as the mode energy expands.

Figure 5:
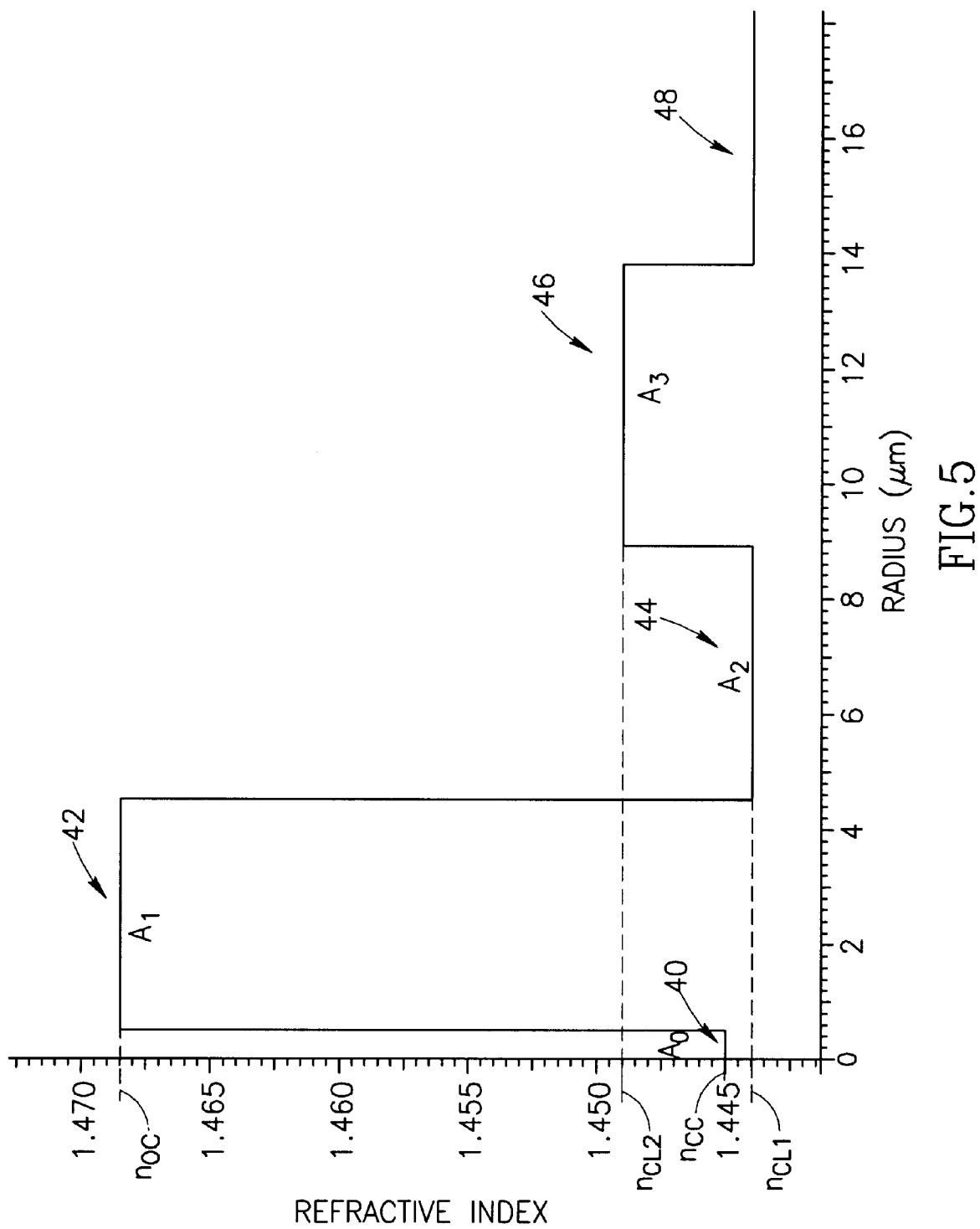
FIG. 5 illustrates a radial view of a refractive index step profile of a dispersion compensating waveguide according to one embodiment of the present invention.

FIG. 5 shows an exemplary step index profile designed to support the $LP_{02}$ mode, according to one embodiment of the present invention with significantly reduced refractive index at the center core portion 40 near the core center ($A_0$). The center core refractive index $n_{CC}$ at the center core portion 40 is close in value to that of the refractive index of the first cladding portion 44. This lower refractive index value facilitates the separation of the modes so as to reduce modal interference. It also serves to reduce the peak intensity so as to minimize non-linear effects. In one illustrative embodiment, the center core refractive index $n_{CC}$ is slightly higher than the first cladding refractive index $n_{CL1}$. In another illustrative embodiment, the maximum value of the outer core refractive index $n_{OC}$ in the outer core portion 42 is lower than the value of the core refractive index of core portion 10 of FIG. 1. In one embodiment of the invention, the value of $(n_{OC}-n_{CC})/n_{OC}$ is greater than 0.2% so as to have an impact on the dispersion characteristics of the profile which are significantly greater than any variance or anomalies detected before, during, or after the fabrication of the waveguide. The width as well as the value of the outer core refractive index $n_{OC}$ in the outer core portion 42 are predetermined to support a higher order mode, preferably the $LP_{02}$ mode.

The step index profile of the present invention further shows a reduced first cladding refractive index $n_{CL1}$ in the first cladding portion 44 surrounding the outer core portion 42. The first cladding portion 44 is designed to confine the $LP_{02}$ mode. In one embodiment, the refractive index $n_{CL1}$ of the first cladding portion 44 is shown with a value equal to the refractive index $n_{CL3}$ of the third cladding portion 48. In other embodiments, the first cladding refractive index $n_{CL1}$ is greater than or less than the refractive index $n_{CL3}$ of the third cladding portion 48. Changing the refractive index $n_{CL1}$ will change the dispersion slope. Note that the width of the first cladding portion 44 is greater than the width of the first cladding portion 12 shown in the prior art step index profile of FIG. 1. In one embodiment, the first cladding refractive index $n_{CL1}$ is achieved with doping as is known to those skilled in the art.

Surrounding the first cladding portion 44 is the second cladding portion 46. The second cladding portion 46 functions to guide the $LP_{02}$ mode further, and prevent any expansion of the $LP_{02}$ mode into the third cladding portion 48. The location and width of the second cladding portion 46 assists in preventing the $LP_{02}$ mode from escaping into the third cladding portion 48 and makes the fiber more resistant to bending losses.

Figure 6:
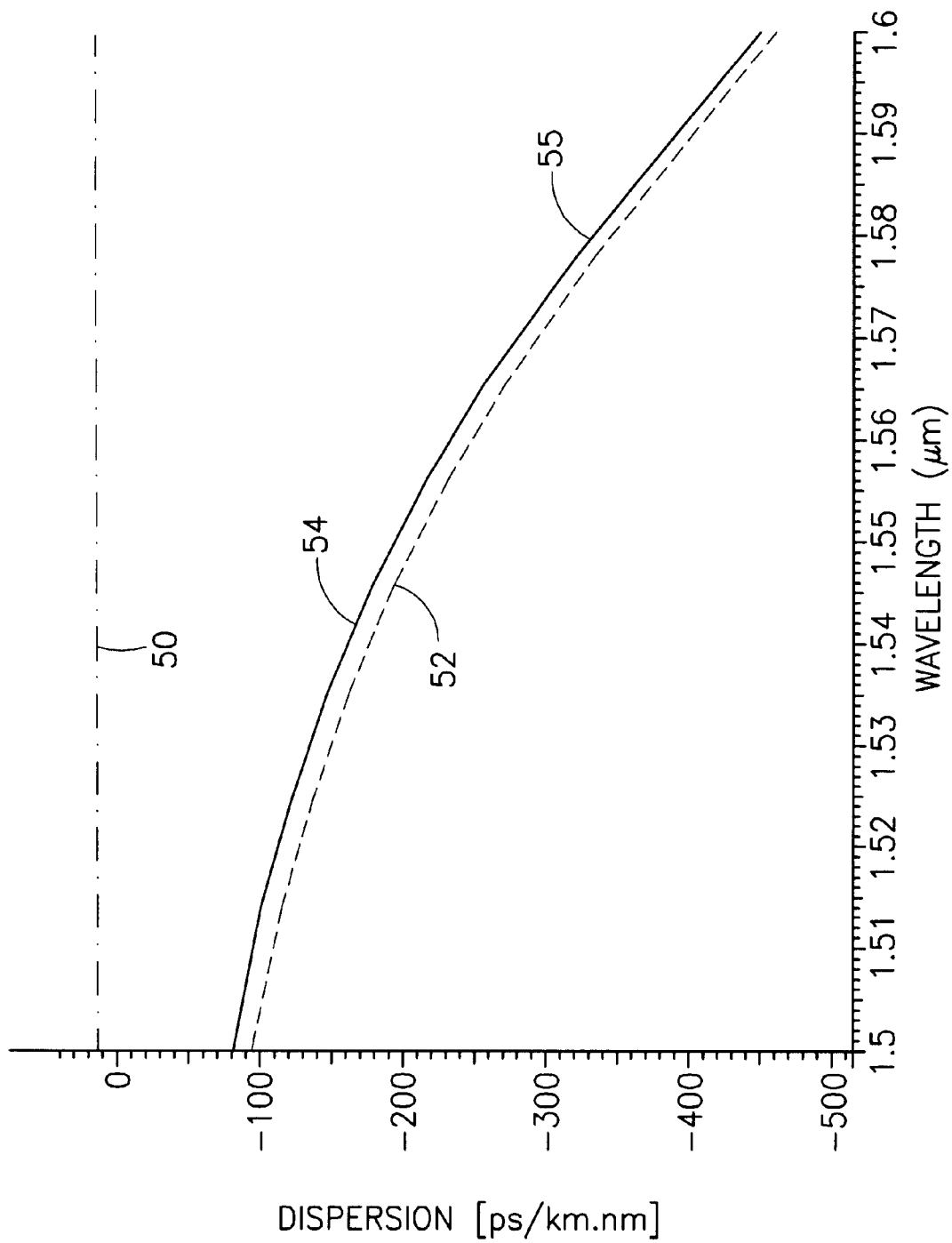
FIG. 6 illustrates material dispersion, waveguide dispersion, and total dispersion as a function of wavelength over the range of 1500 nm to 1600 nm typically achieved for one embodiment of a inventive waveguide having a step index profile of FIG. 5.

FIG. 6 illustrates dispersion curves for one embodiment of the step index profile according to FIG. 5. The total dispersion is defined as the sum of the material dispersion and the waveguide dispersion. Curve 50 represents the material dispersion. Curve 52 represents the waveguide dispersion. The total dispersion is shown as curve 54. The total dispersion curve 54 shows no trough near the operating wavelength of 1550 nm unlike the total dispersion curve 24 (FIG. 2) of the prior art step index fiber. Instead, the total dispersion curve 54 is negative over the operative "C" wavelength range of 1525 nm to 1565 nm with a sharply negative dispersion slope. It is also to be noted that the third order dispersion is negative substantially throughout the entire operating range. It is to be particularly noted that the third order dispersion becomes zero at point 55, which is at approximately 1580 nm, as the slope ceases to become more negative. Adjusting the step index profile allows the dispersion characteristics of the fiber to be modified. This is useful, for example, to establish a desired negative dispersion slope. It is understood by those skilled in the art that a typical single mode fiber SMF exhibits a positive dispersion slope as well as positive dispersion. The dispersion compensating fiber of the present invention is designed to compensate for this dispersion and dispersion slope. The refractive index profile of the present invention is designed to demonstrate sharply negative dispersion slope in the operating wavelength range.

Figure 7:
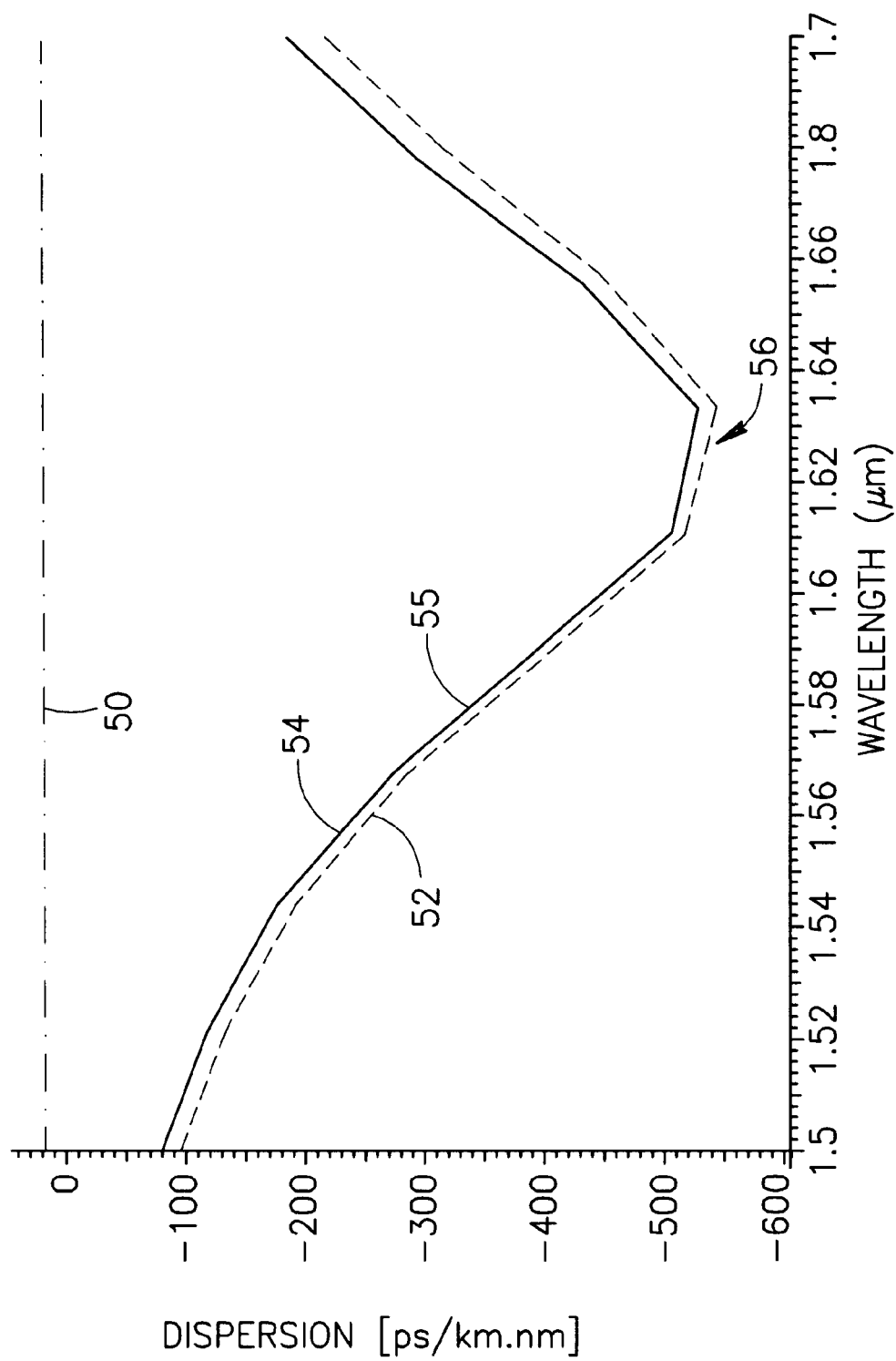
FIG. 7 illustrates material, waveguide, and total dispersion versus wavelength over the range of 1525 nm to 1700 nm typically achieved for one embodiment of a inventive waveguide having a step index profile of FIG. 5.

FIG. 7 illustrates the dispersion curves of FIG. 6 over a wider wavelength range. The total dispersion curve 54 is shown over a wavelength range of 1500 nm to 1700 nm. A trough 56 appears in the wavelength region near 1630 nm. In the operative wavelength of 1550 nm, however, the dispersion is negative with a negative slope and the trough 56 is significantly distant from the operative wavelength range. The subsequent rise in the dispersion after the trough 56 is indicative of the approaching cutoff wavelength of the $LP_{02}$ mode. Third order dispersion approaches zero at approximately 1580 nm, corresponding to point 55 on the total dispersion curve 54. After this point, as wavelength increases, the dispersion slope becomes more positive, and third order dispersion becomes positive.

Figure 8:
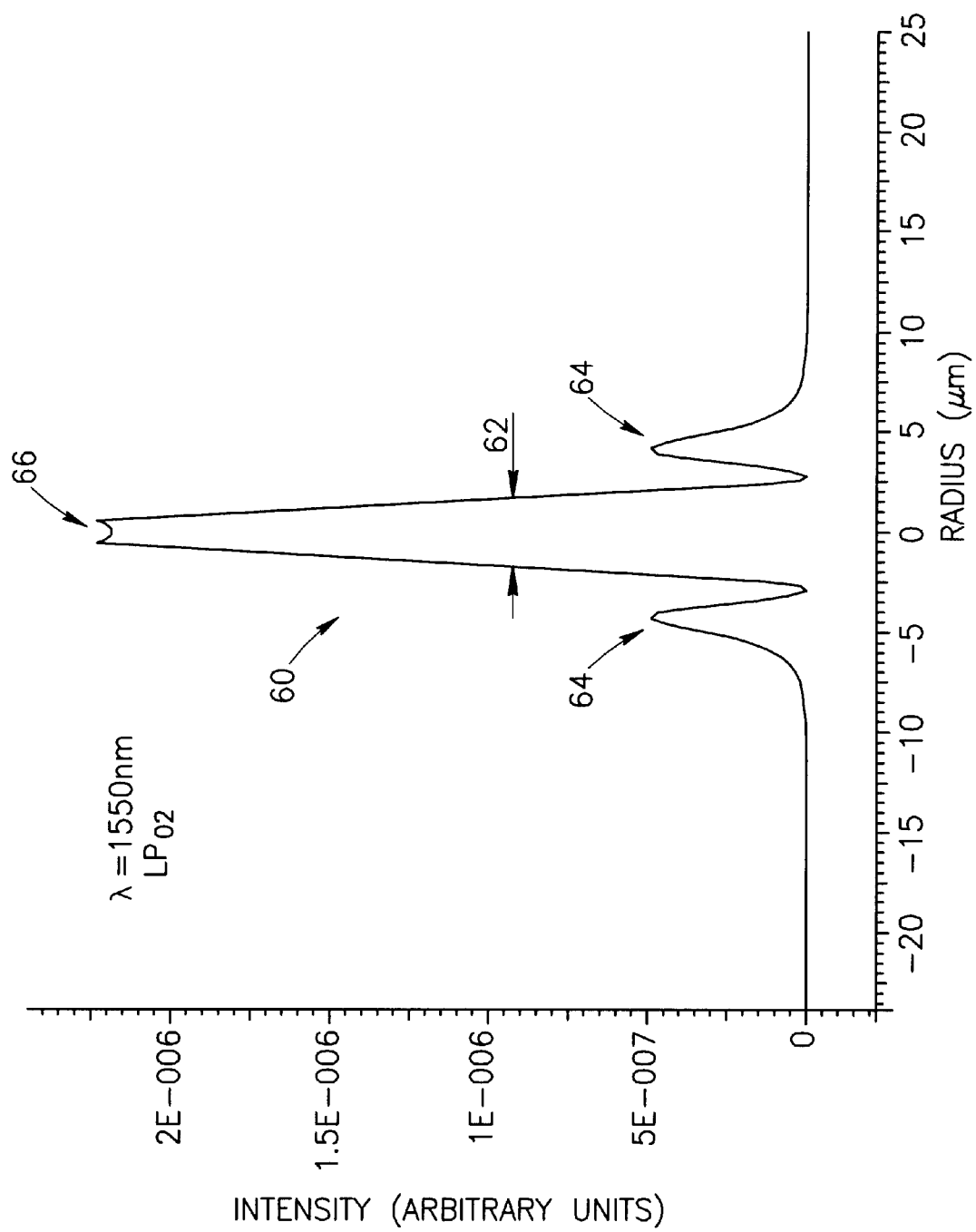
FIG. 8 illustrates intensity versus radial location of the $LP_{02}$ mode at 1550 nm as guided by an embodiment of an inventive fiber having the step index profile of FIG. 5.

FIG. 8 illustrates a plot 60 of the modal energy for the $LP_{02}$ mode at the 1550 nm wavelength for the step index profile as shown in FIG. 5 according to an embodiment of the present invention. The X-axis represents radial distance in microns, and the Y-axis represents energy in arbitrary units. The region 62 of the plot 60 shows the maximum intensity in the center core portion 40 and the outer core portion 42. As shown on the plot 60, a small aberration 66 exists in the top of the intensity curve of region 62. This is due to the depressed refractive index in the center core portion 40. This aberration reduces the maximum peak energy, thus minimizing non-linear effects. Region 64 of plot 60 shows the remaining energy in the first cladding portion 44. Except for the aberration 66, the mode is of normal appearance, with substantially no energy found in the second cladding portion 46. The mode is constrained tightly within the core. Substantially no energy exists beyond a radius of 7.5 μm.

Figure 9:
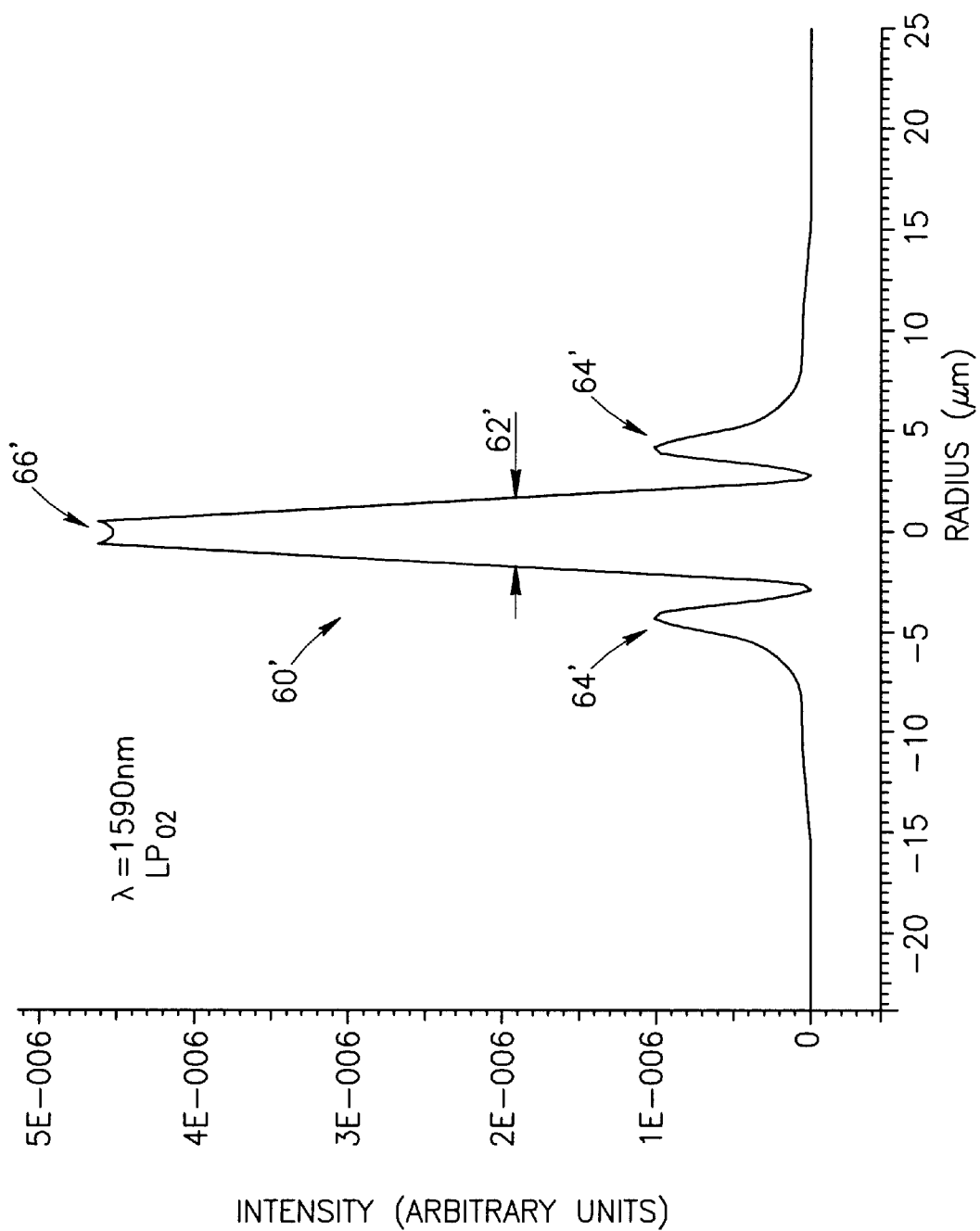
FIG. 9 illustrates intensity versus radial location of the $LP_{02}$ mode at 1590 nm as guided by an embodiment of an inventive fiber having the step index profile of FIG. 5.

FIG. 9 illustrates a plot 60' of the modal energy for the $LP_{02}$ mode at the 1590 nm wavelength for the step index profile as shown in FIG. 5. The wavelength range near 1590 nm is sometimes referred to as the "L" wavelength band. The $LP_{02}$ mode appears to be almost normal with a small aberration 66' in the region 62'. The mode is constrained tightly within the core. Substantially no energy exists past a radius of 7.5 μm. In should be noted that energy is not leaking into the second cladding portion 46 as compared to the plot 30' of the $LP_{02}$ mode shown in FIG. 4. The propagation of the $LP_{02}$ mode at 1590 nm in the prior art step index fiber shows significant energy leaking into the second cladding region 14 of FIG. 1.

Figure 10:
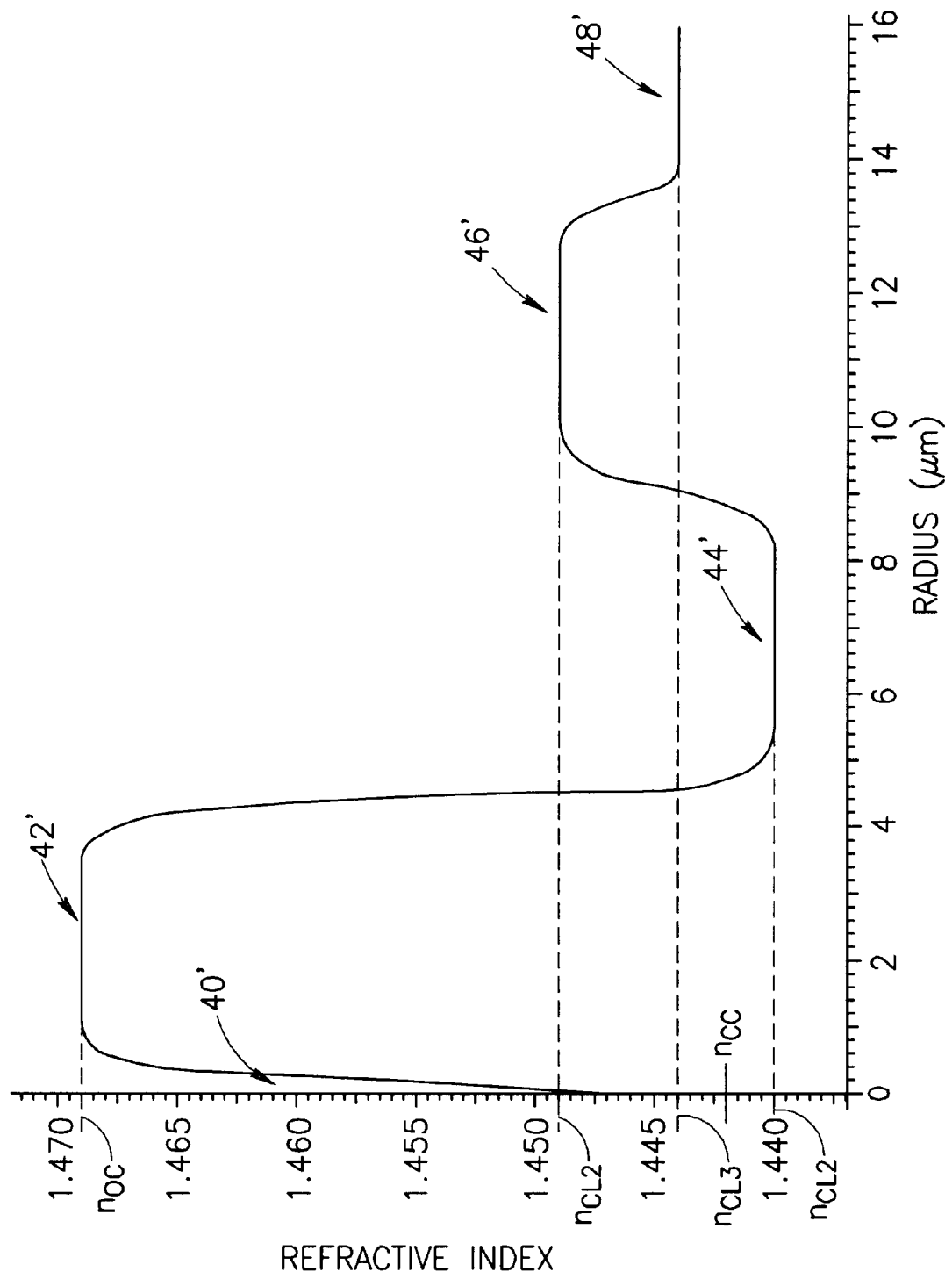
FIG. 10 illustrates a radial view of a simulated manufactured refractive index step profile of a dispersion compensating waveguide according to one embodiment of the present invention.

FIG. 10 illustrates an embodiment of a manufactured profile according to the present invention. The profile steps, which were shown with sharp edges in the embodiment of FIG. 5 actually include rounded edges, due in part to diffusion of dopant during the waveguide manufacturing or fabrication process. These rounded edges do not significantly affect the characteristics of the inventive optical waveguide. As those skilled in the art are aware, actual profiles can vary somewhat from nominal or ideal profiles.

The center core portion 40' has a depressed center core index of refraction $n_{CC}$. As depicted in this illustrative embodiment, the nominal value of $n_{CC}$ is approximately 1.4525. This dip in the refractive index value is created by carefully controlling the manufacturing process. The index of refraction $n_{CC}$ of the center core portion 40' is purposely depressed to advantageously prevent mode coupling between modes supporting in the optical waveguide, and to reduce the peak intensity of the mode. The outer radius of the center core portion 40' is approximately 0.5 μm from the radial center of the waveguide.

The outer core portion 42' has a nominal outer core refractive index value $n_{OC}$ of approximately 1.4690 with an outer radius of approximately 4.6 μm. The first cladding portion 44' has a nominal first cladding refractive index $n_{CL1}$ of approximately 1.44 with an outer radius of approximately 9.0 μm. The second cladding portion 46' has a nominal second cladding refractive index $n_{CL2}$ of approximately 1.4490 with an outer radius of approximately 13.6 μm. The third cladding portion 48' has a nominal third cladding refractive index $n_{CL3}$ of approximately 1.444 with an outer radius which extends to the outer surface of the fiber. In one embodiment, the third cladding refractive index $n_{CL3}$ is the refractive index of pure vitreous $SiO_2$.

Referring to FIG. 10, $\Delta_{CC}\%$ of portion 40' is about 0.7%, $\Delta_{OC}\%$ of portion 42' is about 1.8%, $\Delta_{CL1}\%$ of portion 44' is about −0.28%, and $\Delta_{CL2}\%$ of portion 46' is about 0.35%. The respective outside radius of each segment, starting with the innermost segment and proceeding outward is about 0.5 μm, 4.6 μm, 9.0 μm, and 13.6 μm, respectively. The widths and percentages may be modified in a manner known to those skilled in the art, so as to achieve the desired characteristics.

Figure 11A:
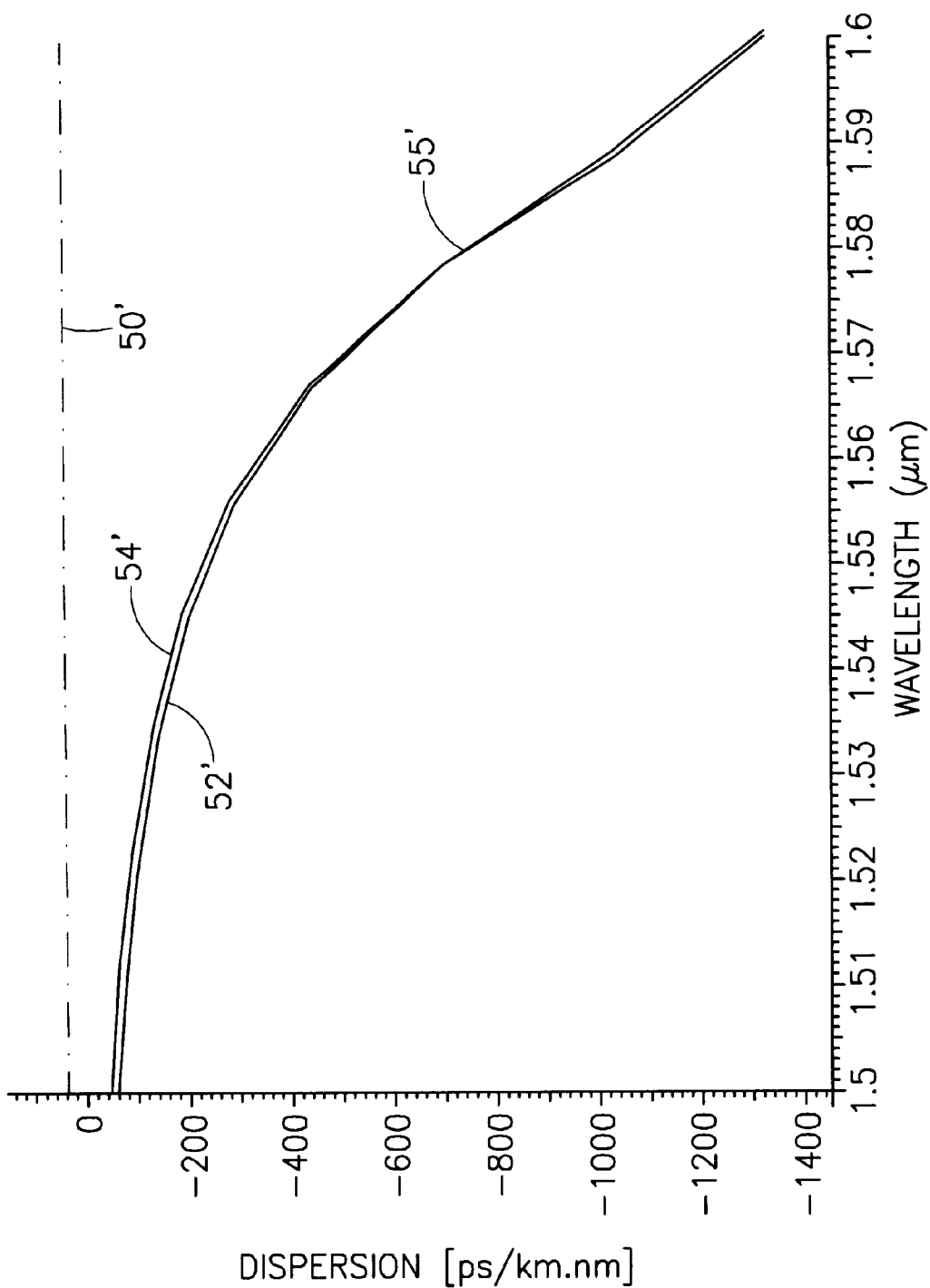
FIG. 11A illustrates material dispersion, waveguide dispersion, and total dispersion versus wavelength over the range of 1500 nm to 1600 nm typically achieved for one embodiment of a inventive waveguide having a simulated manufactured step index profile of FIG. 10.

FIG. 11A illustrates dispersion curves of the $LP_{02}$ mode for one embodiment of the step index profile according to FIG. 10. The total dispersion is defined as the sum of the material dispersion and the waveguide dispersion. Curve 50' represents the material dispersion. Curve 52' represents the waveguide dispersion. The total dispersion is shown as curve 54'. The total dispersion curve 54' has no trough near the operating wavelength of 1550 nm. Instead, the total dispersion curve 54' is negative over the "C" band operative wavelength range of 1525 nm to 1565 nm, with a high negative dispersion slope. The third order dispersion is negative substantially over the "C" band, approaching zero at approximately 1580 nm. Adjusting the step index profile can modify the dispersion characteristics of the fiber. This is useful, for example, to arrive at a predetermined negative dispersion slope. It is understood by those skilled in the art that a typical single mode fiber (SMF) exhibits a positive dispersion slope as well as positive dispersion. The dispersion compensating fiber of the present invention, in one aspect, is designed to compensate for this dispersion and dispersion slope.

Figure 11B:
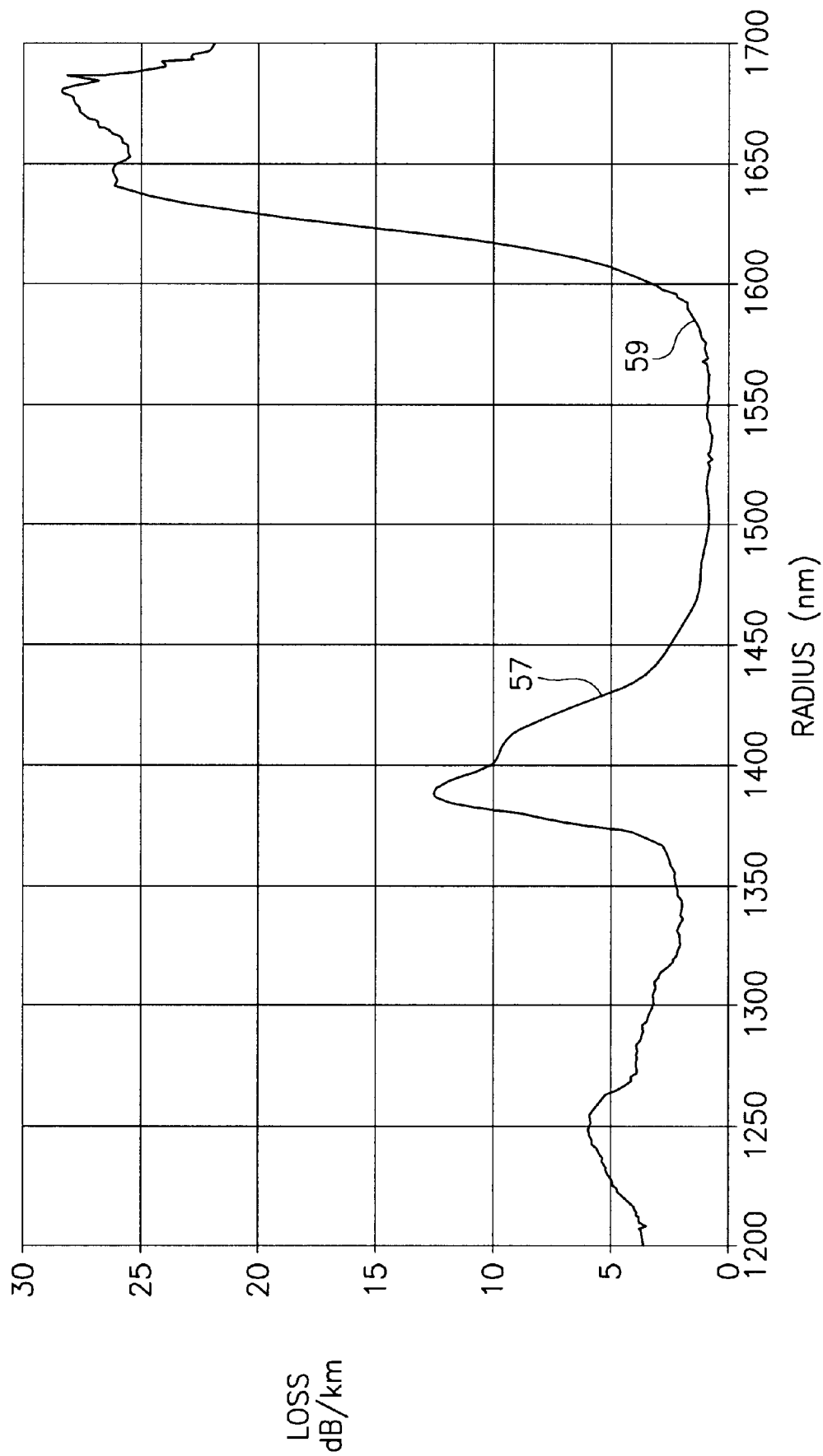
FIG. 11B illustrates the actual loss for the LP02 mode for one embodiment of an inventive waveguide having the simulated manufactured step index profile of FIG. 10.

FIG. 11B illustrates the actual experimental loss for the LP02 mode for one embodiment of a inventive waveguide having a simulated manufactured step index profile of FIG. 10, shown as curve 57. The X-axis represents wavelength in nanometers and the Y-axis represents loss in dB/km. Low loss is experienced in the "C" band from 1525 nm to 1565 nm, with attenuation or loss increasing significantly at approximately 1580 nm, shown as point 59. This closely corresponds with point 55' of FIG. 11A, at which the third order dispersion is approximately zero.

Figure 12:
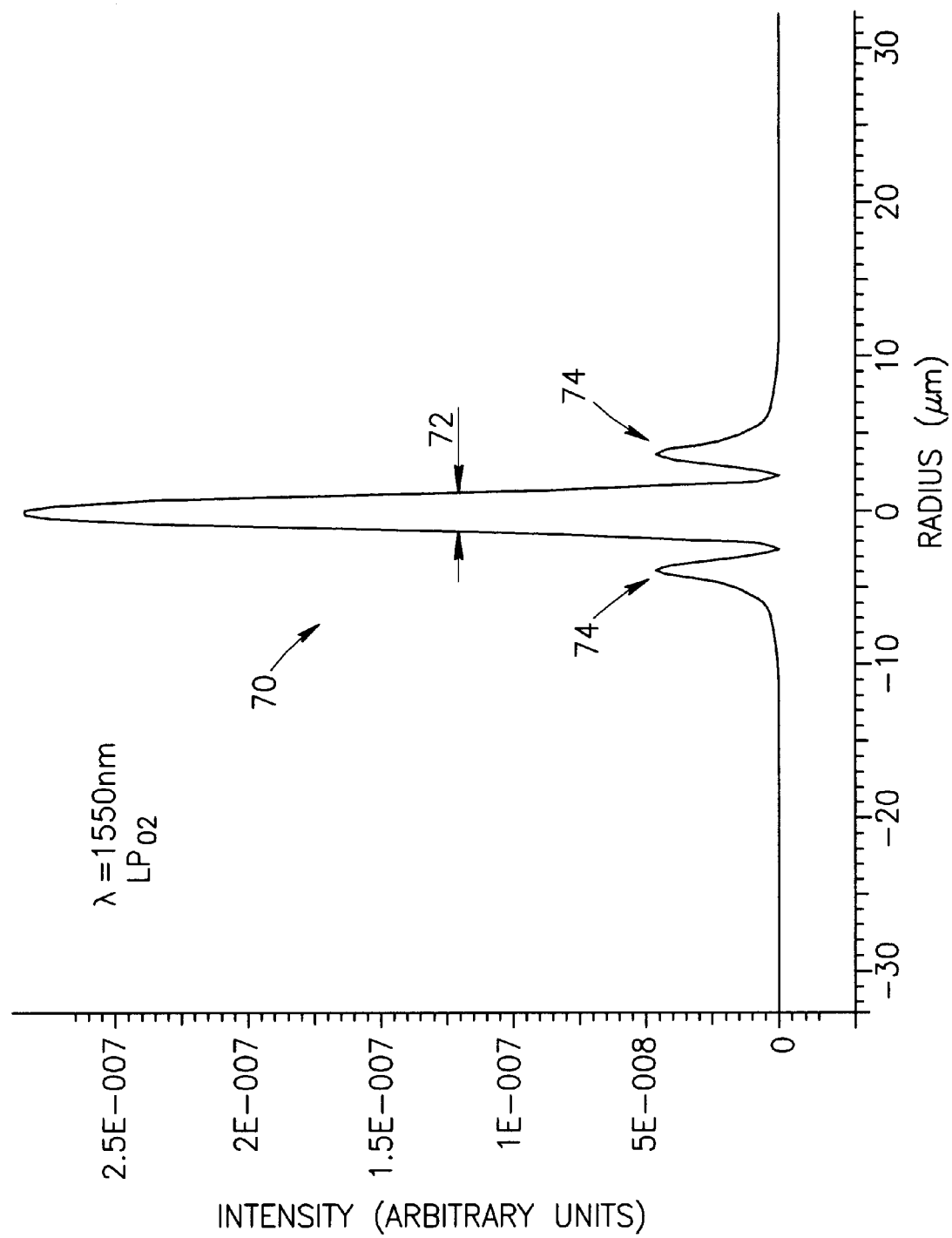
FIG. 12 illustrates intensity versus radial location of the $LP_{02}$ mode at 1550 nm as guided by an embodiment of an inventive fiber having the simulated manufactured step index profile of FIG. 10.

FIG. 12 illustrates a plot 70 of the modal energy for the $LP_{02}$ mode at the 1550 nm wavelength for the step index profile as shown in FIG. 10 according to an embodiment of the present invention. The X-axis represents radial distance in microns and the Y-axis represents energy in arbitrary units. The region 72 of the plot 70 shows the maximum intensity in the center core portion 40' and the outer core portion 42'. Region 74 of plot 70 shows the remaining energy in the first cladding portion 44'. The mode is of normal appearance, with substantially no energy found in the second cladding portion 46'. The mode is constrained tightly within the core. Substantially no energy exists beyond a radius of 7.5 μm.

Figure 13:
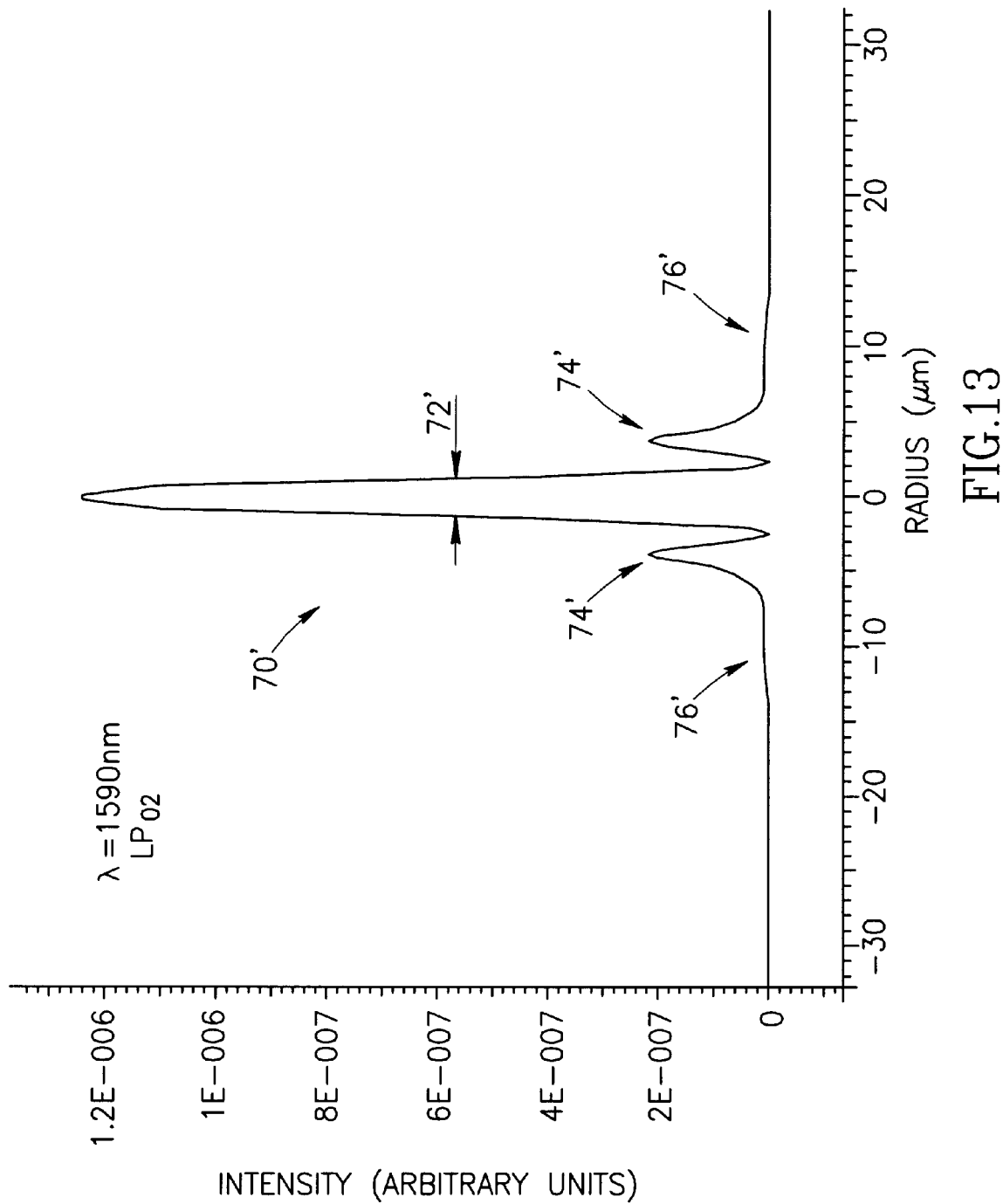
FIG. 13 illustrates intensity versus radial location of the $LP_{02}$ mode at 1590 nm as guided by an embodiment of an inventive fiber having the simulated manufactured step index profile of FIG. 10.

FIG. 13 illustrates a plot 70' of the modal energy for the $LP_{02}$ mode at the 1590 nm wavelength for the step index profile as shown in FIG. 10. The mode is constrained tightly within the core. Substantially no energy exists beyond a radius of 7.5 m, except for an almost imperceptible rise at point 76' indicating that the mode is beginning to expand into the second cladding portion 46' and the cutoff wavelength is approaching. It should be noted that significant energy is not leaking into the second cladding portion 46' as compared to the plot 30' of the $LP_{02}$ mode shown in FIG. 4. The propagation of the $LP_{02}$ mode at 1590 nm in the prior art step index fiber shows significant energy leaking into the second cladding region 14 of FIG. 1.

In designing dispersion compensating fibers, several manufacturing issues can be addressed. Four important manufacturing process methods used for fabricating silica fibers include modified chemical vapor deposition (MCVD), plasma-activated chemical vapor deposition (PCVD), outside vapor deposition (OVD), and vapor axial deposition (VAD). Generally, the fiber is drawn from a preform under a high-localized temperature. As a result, diffusion of the preform components occurs during the preform preparation and during the drawing process itself. This diffusion can distort the refractive index profile. The manufacturing process will generally create a smoothed refractive index profile as shown in FIG. 10, instead of the sharp step profile illustrated in FIG. 5.

Well-known silica dopants such as $GeO_2$, $P_2O_5$, F and $B_2O_2$ are used to increase or decrease the refractive index of silica and can be used to create refractive index profiles in dispersion compensating fibers. In comparison to common single mode fibers (SMFs), dispersion compensating fibers (DCFs) are characterized by having higher values of Germanium concentration in the core area ($A_1$). This high Germanium concentration increases loss in the range of 1550 nm, therefore, the fiber must be carefully monitored during and the fiber's drawing process (i.e., temperature & rate) to minimize the extra loss.

In designing a dispersion compensating fiber based on the $LP_{02}$ mode, several parameters must be determined. A high negative dispersion (e.g. <−100 ps/nm·km) is desirable. Additionally, variable dispersion slope (e.g. more than +1 to less than −3.5 ps/mn$^2$·km) can be selected to compensate for broad-band dispersion. The fiber should be relatively insensitive to polarization orientation to eliminate the need for polarization maintenance. The fiber should exhibit low non-linear effects when high power is used. The $LP_{02}$ mode has significant power in the cladding. As a result the $LP_{02}$ mode is inherently sensitive to spooling. The refractive index profile of the present invention is designed to reduce this sensitivity. The segmented core-clad refractive index profile design of the present invention is sufficiently flexible to achieve high negative dispersion for a wide range of dispersion compensation.

By changing the dimensions of the different segments of the profile, the dispersion curve can be shifted or sharpened. As a result, the dispersion, dispersion slope, and third order dispersion of the $LP_{02}$ mode at the same spectral region can have various dispersion magnitudes.

Figure 14:
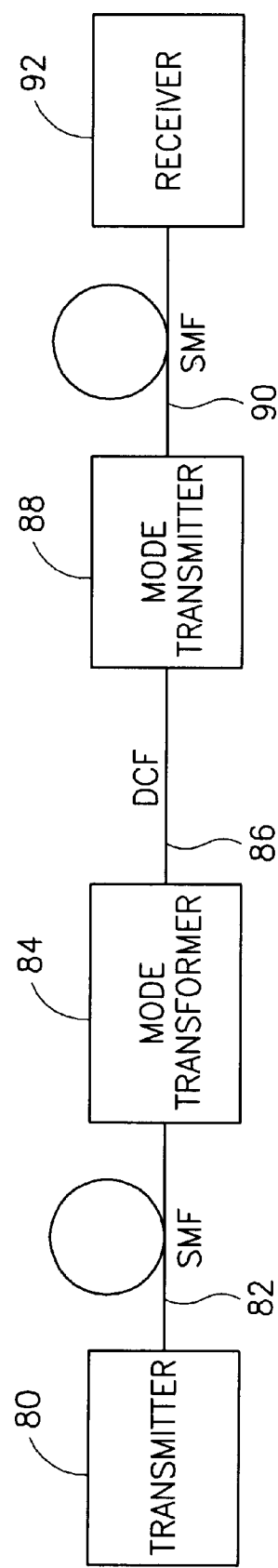
FIG. 14 illustrates a block diagram of a dispersion compensated communication system using an embodiment of the dispersion compensating waveguide of the present invention.

A system utilizing the fiber index profile shown in FIG. 5 or FIG. 10 is shown in FIG. 14. The system of FIG. 14 comprises a transmitter 80 coupled to a single mode fiber 82 for data transmission using the $LP_{01}$ mode. The fiber typically exhibits some amount of positive dispersion and positive dispersion slope. After coupling a mode transformer 84 to the SMF 82 to transform the $LP_{01}$ mode to a higher order mode, a high order dispersion compensating fiber (DCF) 86 is used to compensate for the dispersion and dispersion slope of the SMF 82. If another SMF 90 is coupled to the communication system, the DCF 86 having the correct properties will pre-compensate for that SMF 90. A second mode transformer 88 is used to transform the high order mode to the $LP_{01}$ mode to be transmitted in the SMF 90. Receiver 92 is coupled to the SMF 90 for receiving the data.

Alternatively, receiver 92 may be coupled directly to mode transformer 88 (not shown). In this embodiment, pre-compensation is not necessary by DCF 86 since the second SMF 90 is not part of the system.

Having described and shown the preferred embodiments of the invention, it will now become apparent to one of skill in the art that other embodiments incorporating the concepts may be used and that many variations are possible which will still be within the scope and spirit of the claimed invention. In particular, an optical waveguide may be designed to exhibit the desired properties for the "L" band, and/or for both the "L" band and the "C" band. It is felt, therefore, that these embodiments should not be limited to disclosed embodiments but rather should be limited only by the spirit and scope of the following claims.

What is claimed is:

1. A limited mode dispersion compensating optical waveguide supporting at least one higher order spatial mode comprising an optical fiber, wherein said optical fiber exhibits negative dispersion, negative dispersion slope and negative or zero third order dispersion in said high order spatial mode substantially over an operative wavelength range.

2. The optical waveguide of claim 1 further comprising:
   a center core portion having a center core refractive index $n_{CC}$;
   an outer core portion surrounding said center core portion and having an outer core refractive index $n_{OC}$, said outer core refractive index $n_{OC}$ being greater than said center core refractive index $n_{CC}$; and
   a first cladding portion surrounding said outer core portion and having a first cladding refractive index $n_{CL1}$, said first cladding refractive index $n_{CL1}$ being less than said outer core refractive index $n_{OC}$.

3. The optical waveguide of claim 2 further comprising a second cladding portion surrounding said first cladding portion and having a second cladding refractive index $n_{CL2}$, said second cladding refractive index $n_{CL2}$ being greater than said first cladding refractive index $n_{CL1}$.

4. The optical waveguide of claim 3 further comprising a third cladding portion surrounding said second cladding portion and having a third cladding refractive index $n_{CL3}$, said third cladding refractive index $n_{CL3}$ being less than said second cladding refractive index $n_{CL2}$.

5. The optical waveguide of claim 4 wherein the first cladding refractive index $n_{CL1}$ and the third cladding refractive index $n_{CL3}$ are substantially the same value.

6. The optical waveguide of claim 4 wherein said third cladding refractive index $n_{CL3}$ is substantially the same value as said center core refractive index $n_{CC}$.

7. The optical waveguide of claim 4 wherein said center core refractive index $n_{CC}$ is less than said third cladding refractive index $n_{CL3}$.

8. The optical waveguide of claim 4 wherein said third cladding refractive index $n_{CL3}$ is less than said center core refractive index $n_{CC}$.

9. The optical waveguide of claim 2 wherein said first cladding refractive index $n_{CL1}$ is less than said center core refractive index $n_{CC}$.

10. The optical waveguide of claim 2 wherein said first cladding refractive index $n_{CL1}$ is substantially the same value as said center core refractive index $n_{CC}$.

11. The optical waveguide of claim 2 wherein said first cladding refractive index $n_{CL1}$ is greater than said center core refractive index $n_{CC}$.

12. The optical waveguide of claim 1 wherein said operative wavelength range is from approximately 1525 nm to approximately 1565 nm.

13. The optical waveguide of claim 1 wherein said operative wavelength range is from approximately 1565 nm to approximately 1610 nm.

14. The optical waveguide of claim 1 wherein said limited mode dispersion compensating optical waveguide supports a plurality of high order spatial modes.

15. The optical waveguide of claim 1 wherein said at least one high order spatial mode is the $LP_{02}$ spatial mode.

16. An optical communication system comprising:

an optical transmitter for generating an optical signal;

an optical transmission fiber optically coupled to said optical transmitter;

a limited mode dispersion compensating optical waveguide supporting at least one higher order spatial mode, wherein said optical waveguide exhibits negative dispersion, negative dispersion slope and negative or zero third order dispersion in said higher order mode substantially over an operative wavelength range, said limited mode dispersion compensating optical waveguide being optically coupled to said optical transmission fiber; and a receiver optically coupled to said limited mode dispersion compensating optical waveguide, wherein said receiver generates an output signal in response to said optical signal.

17. The system of claim 16 further comprising a mode transformer disposed between said optical transmission fiber and said limited mode dispersion compensating optical waveguide.

18. The system of claim 16 wherein said optical transmission fiber is a single mode optical fiber.

19. A limited mode dispersion compensating optical waveguide, said optical waveguide comprising:

a center core portion having a center core refractive index $n_{CC}$, wherein the ratio of the difference between an outer core refractive index $n_{OC}$ and said center core refractive index $n_{CC}$ to said outer core refractive index $n_{OC}$ is greater than about 0.2%;

an outer core portion surrounding said center core portion and having said outer core refractive index $n_{OC}$, said outer core refractive index $n_{OC}$ being greater than said center core refractive index $n_{CC}$; and a first cladding portion surrounding said outer core portion and having a first cladding refractive index $n_{CL1}$, said first cladding refractive index $n_{CL1}$, being less than said outer core refractive index $n_{OC}$, wherein said limited mode dispersion compensating optical waveguide supports at least one high order spatial mode.

20. The optical waveguide of claim 19 wherein said limited mode dispersion compensating optical waveguide exhibits negative dispersion and negative dispersion slope over an operative wavelength range.

21. The optical waveguide of claim 20 wherein said limited mode dispersion compensating optical waveguide further exhibits negative or zero third order dispersion substantially over an operative wavelength range.

22. The optical waveguide of claim 21 wherein said operative wavelength range is from approximately 1525 nm to approximately 1565 nm.

23. The optical waveguide of claim 21 wherein said operative wavelength range is from approximately 1565 nm to approximately 1610 nm.

24. The optical waveguide of claim 19 wherein said operative wavelength range is from approximately 1525 nm to approximately 1565 nm.

25. The optical waveguide of claim 19 wherein said operative wavelength range is from approximately 1565 nm to approximately 1610 nm.

26. The optical waveguide of claim 19 further comprising a second cladding portion surrounding said first cladding portion and having a second cladding refractive index $n_{CL2}$, said second cladding refractive index $n_{CL2}$ being greater than said first cladding refractive index $n_{CL1}$.

27. The optical waveguide of claim 26 further comprising a third cladding portion surrounding said second cladding portion and having a third cladding refractive index $n_{CL3}$, said third cladding refractive index $n_{CL3}$ being less than said second cladding refractive index $n_{CL2}$.

28. The optical waveguide of claim 19 wherein said limited mode dispersion compensating optical waveguide supports a plurality of high order spatial modes.

29. The optical waveguide of claim 19 wherein said at least one high order spatial mode is the $LP_{02}$ spatial mode.

\* \* \* \* \*